(12) United States Patent
Kriebernegg et al.

(10) Patent No.: US 7,694,598 B2
(45) Date of Patent: Apr. 13, 2010

(54) TWO-SPEED TRANSFER CASE WITH ADAPTIVE TORQUE TRANSFER CLUTCH

(75) Inventors: August Kriebernegg, Koeflach (AT); Klaus Lippitsch, Graz (AT)

(73) Assignee: Magna Powertrain AG & Co KG, Lannach (AT)

( * ) Notice: Subject to any disclaimer, the term of this patent is extended or adjusted under 35 U.S.C. 154(b) by 434 days.

(21) Appl. No.: 11/696,429

(22) Filed: Apr. 4, 2007

(65) Prior Publication Data

US 2007/0251345 A1 Nov. 1, 2007

Related U.S. Application Data

(60) Provisional application No. 60/795,234, filed on Apr. 26, 2006.

(51) Int. Cl.
| F16D 27/08 | (2006.01) |
| F16D 47/02 | (2006.01) |
| F16D 21/08 | (2006.01) |
| F16H 59/00 | (2006.01) |
| F16H 61/00 | (2006.01) |
| F16H 63/00 | (2006.01) |

(52) U.S. Cl. .................... 74/337.5; 192/48.2; 192/48.5; 192/48.7

(58) Field of Classification Search .................... 74/335, 74/337.5; 192/48.2, 48.5, 48.6, 48.7
See application file for complete search history.

(56) References Cited

U.S. PATENT DOCUMENTS

| 4,664,217 A | 5/1987 | Welch et al. |
| 4,805,486 A | 2/1989 | Hagiwara et al. |
| 4,895,236 A | 1/1990 | Sakakibara et al. |
| 4,950,214 A | 8/1990 | Botterill |
| 5,007,886 A | 4/1991 | Holmquist et al. |
| 5,080,640 A | 1/1992 | Botterill |
| 5,323,871 A | 6/1994 | Wilson et al. |
| 5,352,164 A | 10/1994 | Bensinger et al. |
| 5,363,938 A | 11/1994 | Wilson et al. |
| 5,407,024 A | 4/1995 | Watson et al. |
| 5,423,235 A | 6/1995 | Botterill et al. |
| 5,520,590 A | 5/1996 | Showalter et al. |
| 5,655,986 A | 8/1997 | Wilson et al. |
| 5,697,861 A | 12/1997 | Wilson |
| 5,699,870 A | 12/1997 | Warren |

(Continued)

FOREIGN PATENT DOCUMENTS

DE 3908478 A1 10/1989

(Continued)

*Primary Examiner*—Tisha D Lewis
(74) *Attorney, Agent, or Firm*—Harness, Dickey & Pierce, P.L.C.

(57) ABSTRACT

A transfer case includes a two-speed range unit, a friction clutch, a power-operated actuation mechanism and a control system. The actuation mechanism includes an electric motor, a geartrain driven by the motor for controlling rotation of an actuator shaft, a range actuator assembly and a mode actuator assembly. The range actuator assembly functions to move a shift collar associated with the range unit in response to rotation of the actuator shaft. The mode actuator assembly includes a mode cam and a ballramp unit. The mode cam is rotatively driven by the actuator shaft for controlling the clutch engagement force exerted on the friction clutch by the ballramp unit.

17 Claims, 15 Drawing Sheets

U.S. PATENT DOCUMENTS

| | | | |
|---|---|---|---|
| 5,980,415 | A | 11/1999 | Showalter |
| 6,173,624 | B1 | 1/2001 | Decker |
| 6,203,465 | B1 | 3/2001 | Showalter |
| 6,230,577 | B1 | 5/2001 | Showalter et al. |
| 6,283,887 | B1 | 9/2001 | Brown et al. |
| 6,296,590 | B1 | 10/2001 | Gassmann |
| 6,367,344 | B1 | 4/2002 | Vogt et al. |
| 6,398,686 | B1 | 6/2002 | Irwin |
| 6,405,822 | B1 | 6/2002 | Lee |
| 6,484,857 | B2 | 11/2002 | Vonnegut et al. |
| 6,503,167 | B1 | 1/2003 | Sturm |
| 6,568,519 | B2 | 5/2003 | Lovatt |
| 6,578,693 | B2 | 6/2003 | Mayr |
| 6,645,109 | B2 | 11/2003 | Williams et al. |
| 6,783,475 | B2 | 8/2004 | Gazyakan et al. |
| 6,802,794 | B2 | 10/2004 | Showalter |
| 6,808,037 | B1 | 10/2004 | Mueller |
| 6,824,487 | B2 | 11/2004 | Williams et al. |
| 6,827,663 | B2 | 12/2004 | Tucker-Peake |
| 6,905,436 | B2 | 6/2005 | Mueller et al. |
| 6,929,577 | B2 | 8/2005 | Mueller et al. |
| 6,966,864 | B2 | 11/2005 | Williams et al. |
| 7,032,733 | B2 | 4/2006 | Parigger |
| 7,033,300 | B2 | 4/2006 | Mueller et al. |
| 7,081,064 | B2 | 7/2006 | Mueller et al. |
| 7,111,716 | B2 | 9/2006 | Ekonen et al. |
| 7,337,886 | B2 * | 3/2008 | Puiu ........................ 192/70.23 |
| 7,399,251 | B2 * | 7/2008 | Mueller et al. .............. 475/295 |
| 2002/0142877 | A1 | 10/2002 | Williams et al. |
| 2003/0192401 | A1 | 10/2003 | Thomas et al. |

FOREIGN PATENT DOCUMENTS

| | | |
|---|---|---|
| JP | 2-18117 | 1/1990 |
| JP | 3-66927 | 3/1999 |

* cited by examiner

TWO-SPEED TRANSFER CASE WITH ADAPTIVE TORQUE TRANSFER CLUTCH

CROSS-REFERENCE TO RELATED APPLICATIONS

This application claims the benefit of U.S. Provisional Application No. 60/795,234, filed on Apr. 26, 2006. The disclosure of the above application is incorporated herein by reference.

FIELD OF THE INVENTION

The present invention relates generally to power transfer systems for controlling the distribution of drive torque between the front and rear drivelines of a four-wheel drive vehicle. More particularly, the present invention is directed to a transfer case equipped with a two-speed range unit, a mode clutch assembly and a power-operated actuation mechanism for controlling coordinated actuation of the range unit and the mode clutch assembly.

BACKGROUND OF THE INVENTION

Due to the popularity of four-wheel drive vehicles, a number of power transfer systems are currently being used in vehicular drivetrain applications for selectively directing power (i.e., drive torque) from the powertrain to all four wheels of the vehicle. In many power transfer systems, a transfer case is incorporated into the drivetrain and is operable in a four-wheel drive mode for delivering drive torque from the powertrain to both the front and rear wheels. Many conventional transfer cases are equipped with a mode shift mechanism having a dog-type mode clutch that can be selectively actuated to shift between a two-wheel drive mode and a part-time four-wheel drive mode. In addition, many transfer cases also include a two-speed range shift mechanism having a dog-type range clutch which can be selectively actuated by the vehicle operator for shifting between four-wheel high-range and low-range drive modes.

It is also known to use adaptive power transfer systems for automatically biasing power between the front and rear wheels, without any input or action on the part of the vehicle operator, when traction is lost at either the front or rear wheels. Modernly, it is known to incorporate such a torque "on-demand" feature into a transfer case by replacing the mechanically-actuated mode clutch with a multi-plate clutch assembly and a power-operated clutch actuator that is interactively associated with an electronic control system. During normal road conditions, the clutch assembly is typically maintained in a released condition such that drive torque is only delivered to the rear wheels. However, when sensors detect a low traction condition, the control system actuates the clutch actuator for engaging the clutch assembly to deliver drive torque to the front wheels. Moreover, the amount of drive torque transferred through the clutch assembly to the non-slipping wheels can be varied as a function of specific vehicle dynamics, as detected by the sensors. Such on-demand clutch control systems can also be used in full-time transfer cases to adaptively bias the torque distribution ratio across an interaxle differential.

In some two-speed transfer cases, actuation of the range shift mechanism and the clutch assembly are independently controlled by separate power-operated actuators. For example, U.S. Pat. No. 5,407,024 discloses a two-speed range shift mechanism actuated by an electric motor and a clutch assembly actuated by an electromagnetic ball ramp unit. In an effort to reduce cost and complexity, some transfer cases are equipped with a single power-operated actuator that is operable to coordinate actuation of both the range shift mechanism and the clutch assembly. In particular, U.S. Pat. Nos. 5,363,938 and 5,655,986 each illustrate a transfer case equipped with a motor-driven cam having a pair of cam surfaces adapted to coordinate actuation of the range shift mechanism and the clutch assembly for establishing a plurality of distinct two-wheel and four-wheel drive modes. Examples of other transfer cases equipped with a single power-operated actuator for controlling coordinated engagement of the range shift mechanism and the mode clutch assembly are disclosed in U.S. Pat. Nos. 6,645,109; 6,783,475; 6,802,794; 6,905,436 and 6,929,577.

While conventional transfer cases equipped with coordinated clutch actuation systems have been commercially successful, a need still exists to develop alternative clutch actuation systems which further reduce the cost and complexity of two-speed actively-controlled transfer cases.

SUMMARY OF THE INVENTION

Accordingly, it is an objective of the present invention to provide a transfer case equipped with a two-speed range unit, a mode clutch assembly and a power-operated actuation mechanism for controlling coordinated actuation of the range unit and the mode clutch assembly.

It is another objective of the present invention that the transfer case be interactively associated with a control system for controlling operation of the power-operated actuation mechanism to establish a plurality of distinct two-wheel and four-wheel drive modes.

In accordance with these objections, the transfer case of the present invention is provided with a two-speed range unit, a mode clutch assembly, a power-operated actuation mechanism and a control system. The range unit includes a planetary gearset driven by an input shaft and a dog clutch operable for releasably coupling one of the input shaft and an output component of the planetary gearset to a first output shaft. The mode clutch assembly includes a multi-plate friction clutch operably installed between the first output shaft and a second output shaft. The power-operated actuation mechanism includes an actuator shaft driven by an electric motor, a range actuator assembly and a mode actuator assembly. The range actuator assembly includes a range cam driven by the actuator shaft and a spring-biased shift fork assembly disposed between the range cam and the dog clutch. Movement of the range cam in response to rotary movement of the actuator shaft results in translational movement of the dog clutch between high-range (H), neutral (N) and low-range (L) positions. The mode actuator assembly includes a ballramp unit and a mode cam driven by the actuator shaft. The ballramp unit includes a first cam member, a second cam member and rollers retained in aligned sets of grooves formed between the first and second cam members. The mode cam has a cam surface configured to control angular movement of the second cam member relative to the first cam member in response to rotation of the actuator shaft. Such relative angular movement between the first and second cam members also results in translational movement of the second cam member for controlling the magnitude of a clutch engagement force applied to the multi-plate friction clutch. The control system is adapted to control the magnitude and direction of rotary motion of the actuator shaft through controlled energization of the electric motor.

BRIEF DESCRIPTION OF THE DRAWINGS

Further objects, features and advantages of the present invention will become apparent from analysis of the following written specification including the appended claims, and the accompanying drawings in which:

DETAILED DESCRIPTION OF THE PREFERRED EMBODIMENTS

Figure 1:
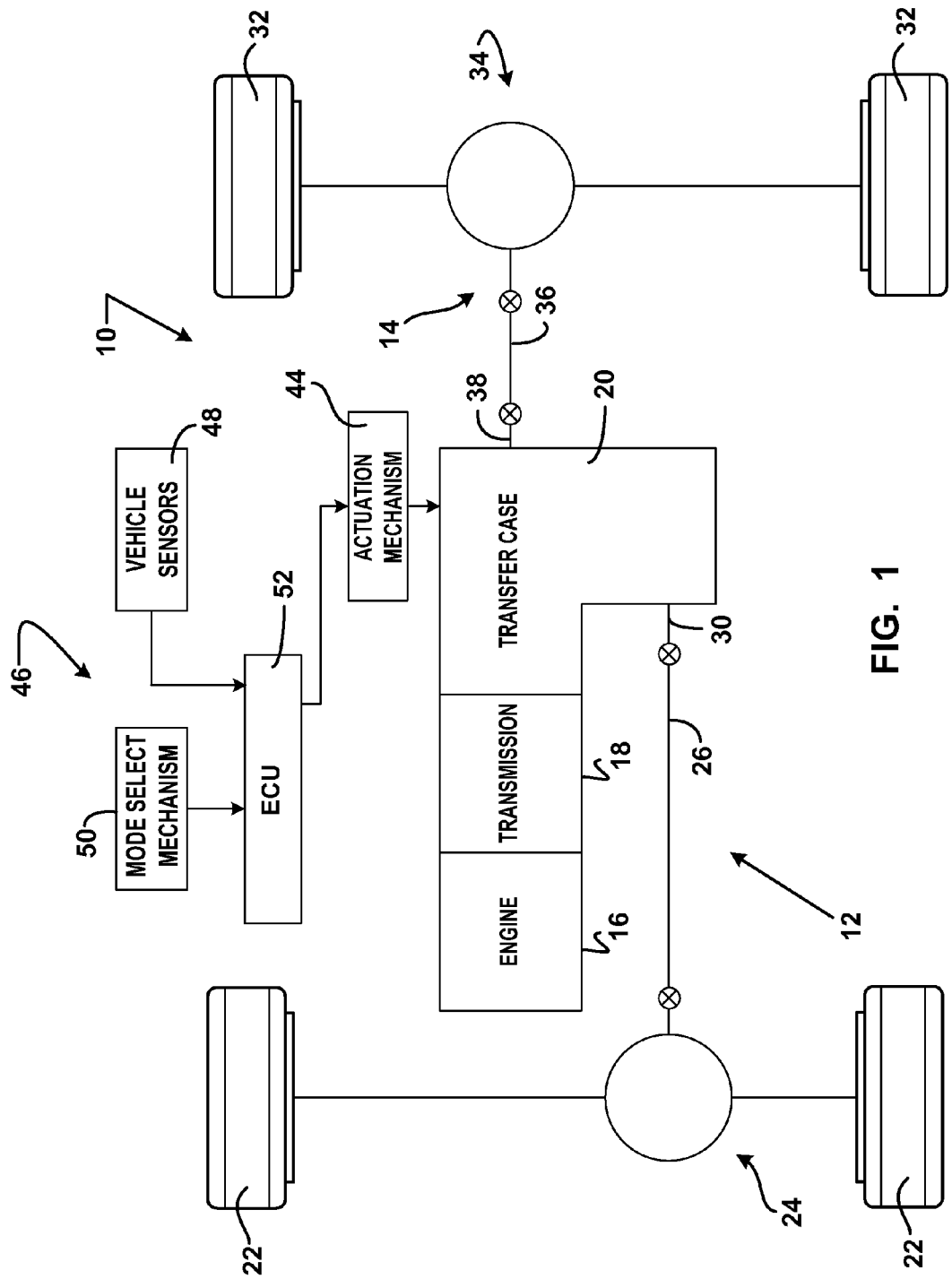
FIG. 1 is a diagrammatical illustration of a four-wheel drive vehicle equipped with a transfer case and clutch control system according to the present invention.

Referring now to FIG. 1 of the drawings, a four-wheel drive vehicle 10 is schematically shown to include a front driveline 12, a rear driveline 14 and a powertrain for generating and selectively delivering rotary tractive power (i.e., drive torque) to the drivelines. The powertrain is shown to include an engine 16 and a transmission 18 which may be of either the manual or automatic type. In the particular embodiment shown, vehicle 10 further includes a transfer case 20 for transmitting drive torque from the powertrain to front driveline 12 and rear driveline 14. Front driveline 12 includes a pair of front wheels 22 connected via a front axle assembly 24 and a front propshaft 26 to a front output shaft 30 of transfer case 20. Similarly, rear driveline 14 includes a pair of rear wheels 32 connected via a rear axle assembly 34 and a rear propshaft 36 to a rear output shaft 38 of transfer case 20.

As will be further detailed, transfer case 20 is equipped with a two-speed range unit 40, a mode clutch assembly 42 and a power-operated actuation mechanism 44 that is operable to control coordinated shifting of range unit 40 and adaptive engagement of mode clutch assembly 42. In addition, a control system 46 is provided for controlling actuation of actuation mechanism 44. Control system 46 includes vehicle sensors 48 for detecting real time operational characteristics of motor vehicle 10, a mode select mechanism 50 for permitting the vehicle operator to select one of the available drive modes and an electronic control unit (ECU) 52 that is operable to generate electric control signals in response to input signals from sensors 48 and mode signals from mode select mechanism 50.

Transfer case 20 is shown to include an input shaft 54 that is adapted to be coupled for driven connection with the output shaft of transmission 18. Input shaft 54 is supported in a housing 56 by a bearing assembly 58 for rotation about a first rotary axis. Rear output shaft 38 is supported between input shaft 54 and housing 56 for rotation about the first rotary axis via a pair of laterally-spaced bearing assemblies 60 and 62. In addition, front output shaft 30 is supported in housing 56 for rotation about a second rotary axis by a pair of bearing assemblies 64 and 66.

Figure 2:
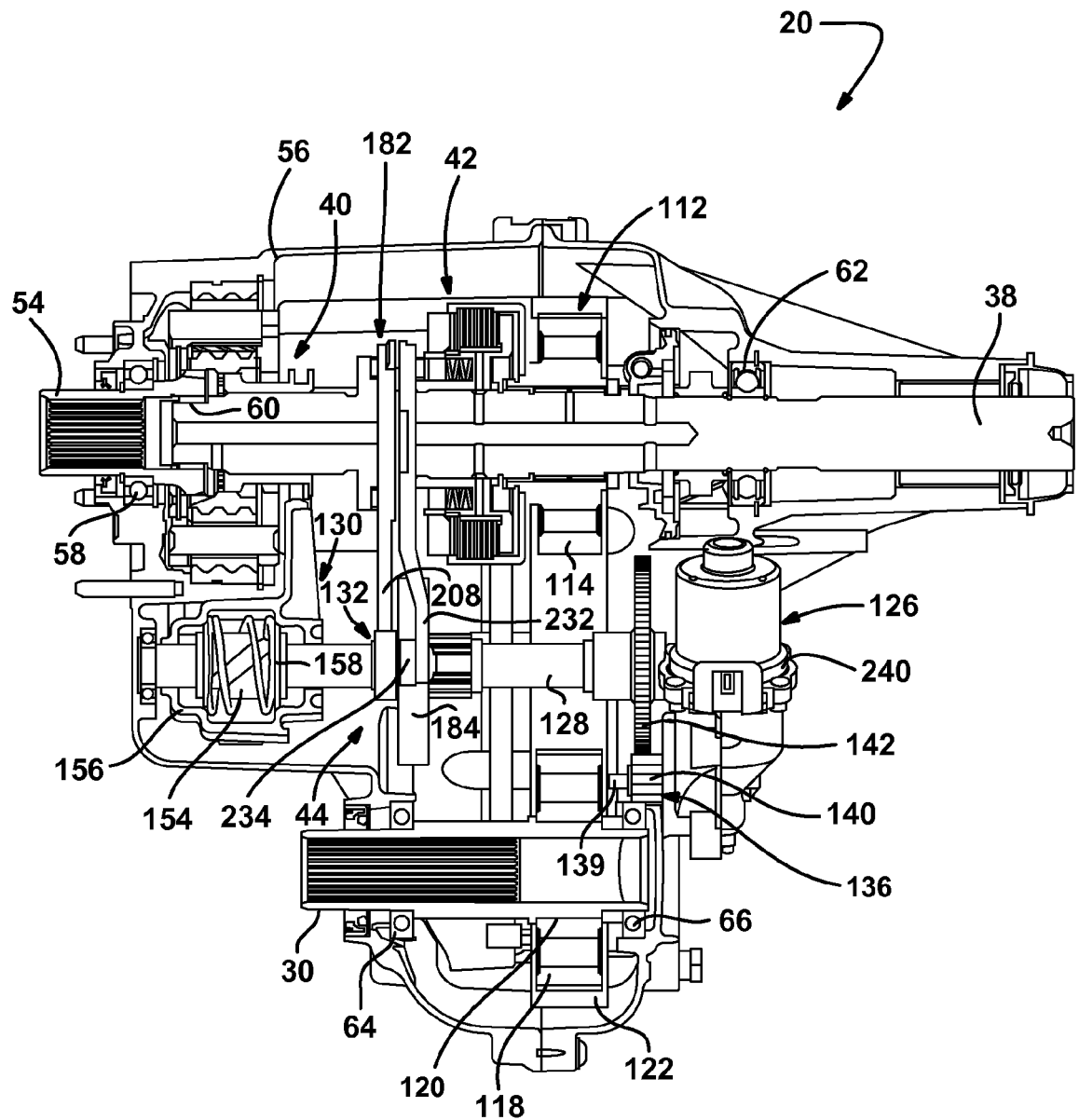
FIGS. 2 and 3 are sectional views of a transfer case constructed according to the present invention to include a two-speed range unit, an on-demand mode clutch assembly and a power-operated actuation mechanism.
Figure 3:
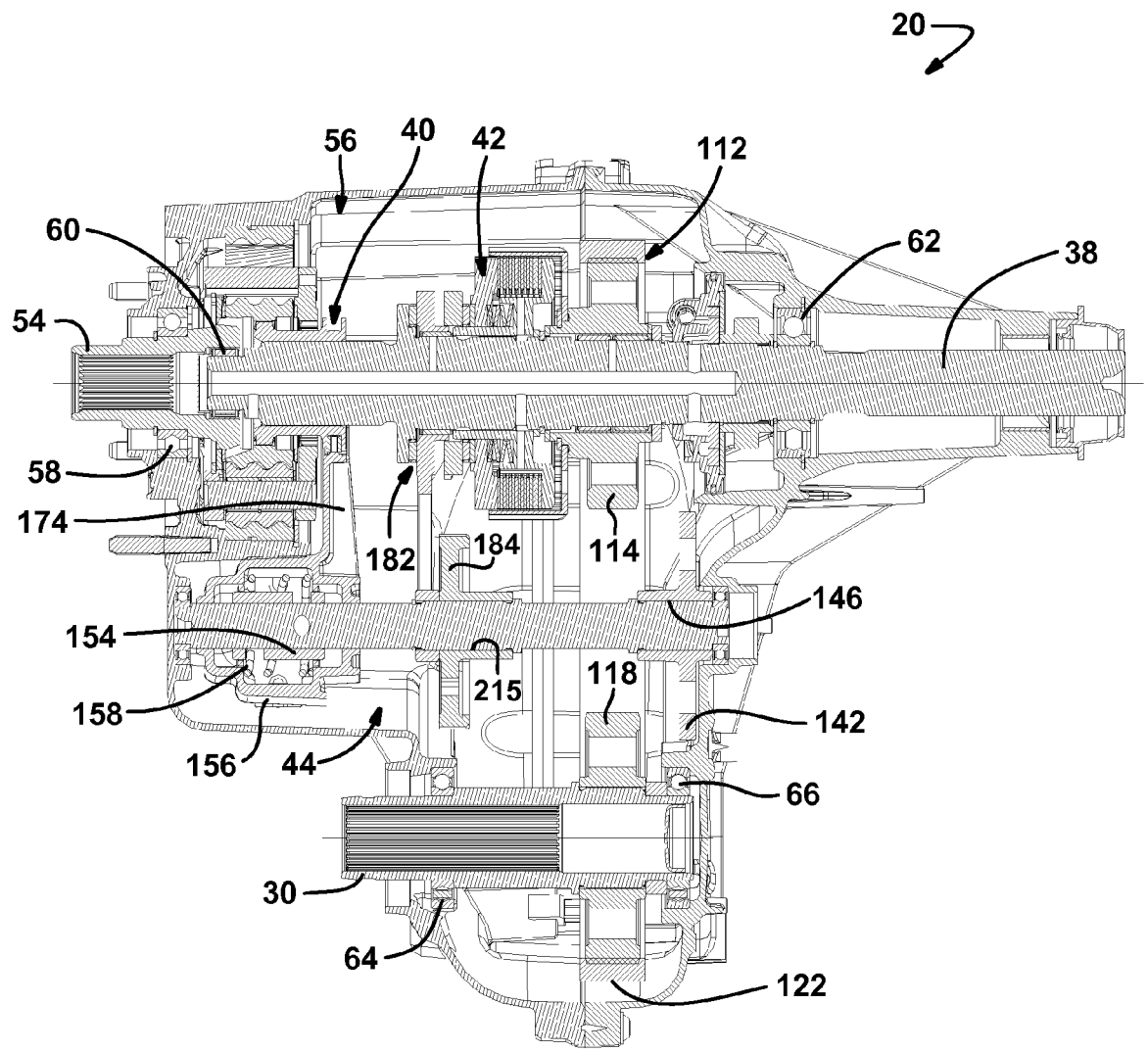
Figure 4:
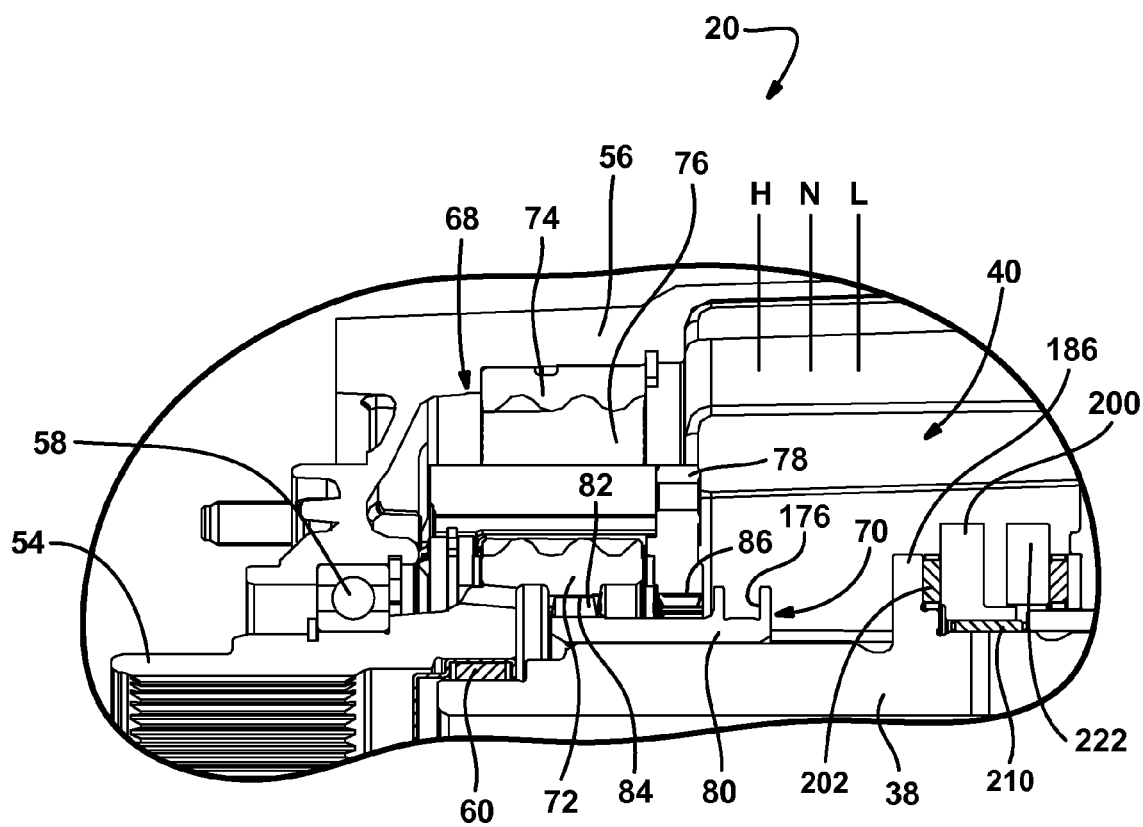
FIGS. 4 and 5 are enlarged partial views of FIG. 3 respectively showing various components of the two-speed range unit and the mode clutch assembly.

As best seen from FIGS. 2 through 4, range unit 40 is shown to generally include a planetary gearset 68 and a dog clutch 70. Planetary gearset 68 has a sun gear 72 driven by input shaft 54, a ring gear 74 non-rotatably fixed to housing 56 and a plurality of planet gears 76 rotatably supported from a planet carrier 78. As seen, planet gears 76 are meshed with both sun gear 72 and ring gear 74. Planetary gearset 68 functions to drive planet carrier 78 at a reduced speed relative to input shaft 54. Dog clutch 70 includes a shift collar 80 coupled via a spline connection for rotation with and axial sliding movement on rear output shaft 38. Shift collar 80 has external clutch teeth 82 adapted to selectively engage either internal clutch teeth 84 formed on input shaft 54 or internal clutch teeth 86 formed on a carrier ring associated with planet carrier 78. Shift collar 80 is shown located in a high (H) range position such that its clutch teeth 82 are engaged with clutch teeth 84 on input shaft 54. As such, a direct speed ratio or "high-range" drive connection is established between input shaft 54 and rear output shaft 38. Shift collar 80 is axially moveable on rear output shaft 38 from its H range position through a central neutral (N) position into a low (L) range position. Location of shift collar 80 in its N position functions to disengage its clutch teeth 82 from both input shaft clutch teeth 84 and carrier clutch teeth 86, thereby uncoupling rear output shaft 38 from driven connection with input shaft 54. In contrast, movement of shift collar 80 into its L range position causes its clutch teeth 82 to engage clutch teeth 86 on planet carrier 78, thereby establishing a reduced speed ratio or "low-range" drive connection between input shaft 54 and rear output shaft 38.

It will be appreciated that planetary gearset 68 and non-synchronized dog clutch 70 function to provide transfer case 20 with a two-speed (i.e., high-range and low-range) feature. However, the non-synchronized range shift unit disclosed could be easily replaced with a synchronized range shift system to permit "on-the-move" range shifting between the high-range and low-range drive modes without the need to stop the motor vehicle. Furthermore, any two-speed reduction unit having a shift member axially moveable to establish first and second drive connections between input shaft 54 and rear output shaft 38 is considered to be within the scope of this invention.

Figure 5:
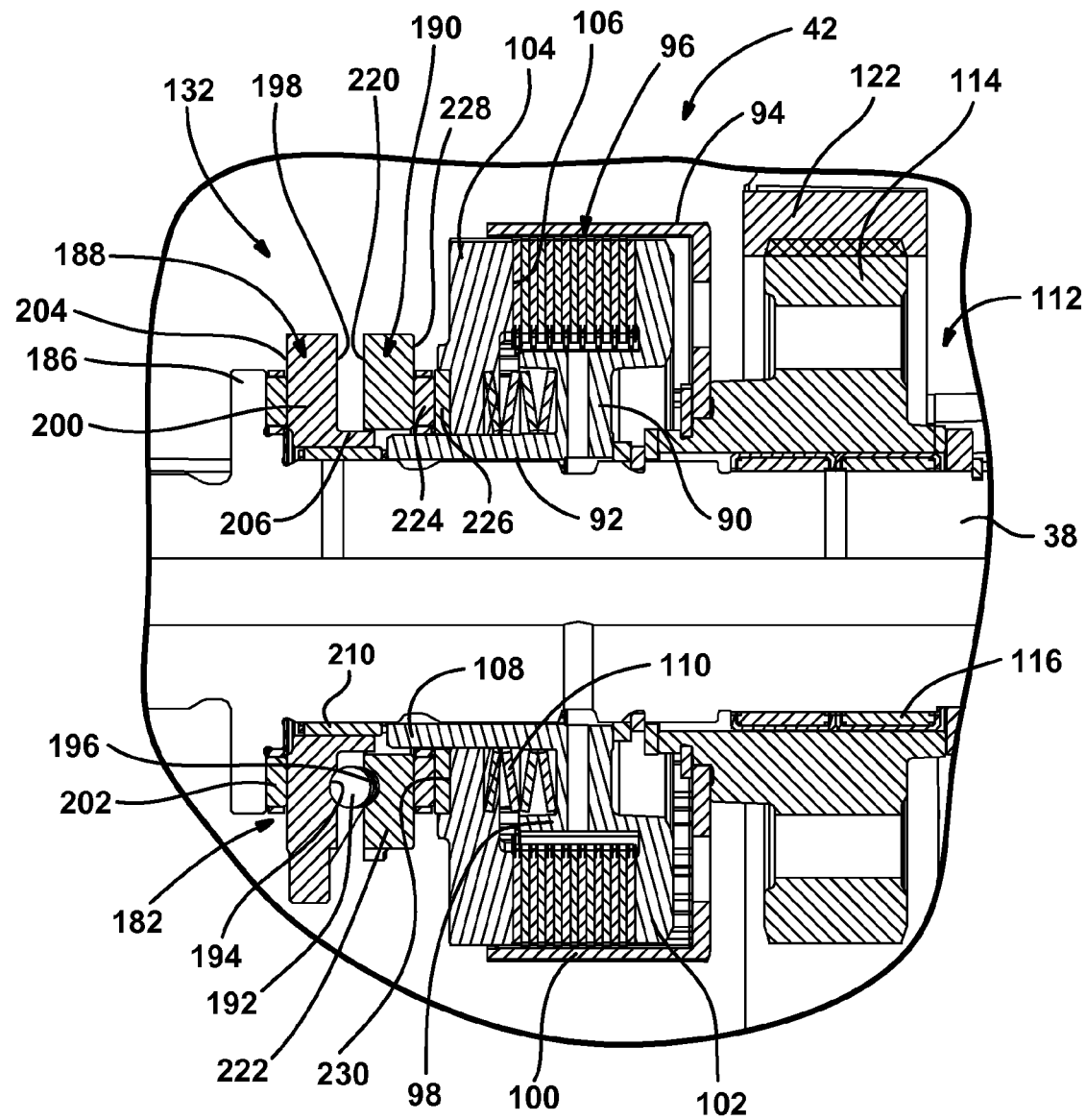

Referring primarily to FIG. 5, mode clutch assembly 42 is shown to include a clutch hub 90 fixed via a spline connection 92 for rotation with rear output shaft 38, a clutch drum 94 and a multi-plate clutch pack 96 operably disposed between hub 90 and drum 94. As seen, clutch pack 96 includes a set of inner clutch plates splined to a cylindrical rim segment 98 of clutch hub 90 and which are alternately interleaved with a set of outer clutch plates splined to a cylindrical rim segment 100 of drum 94. Clutch pack 96 is retained for limited sliding movement between a reaction plate segment 102 of clutch hub 90 and a pressure plate 104. Pressure plate 104 has a face surface 106 adapted to engage and apply a compressive clutch engagement force on clutch pack 96. Pressure plate 104 is splined to rim segment 98 for common rotation with clutch hub 90 and is further supported for sliding movement on a tubular sleeve segment 108 of clutch hub 90. A return spring 110 is provided between hub 90 and pressure plate 104 for normally biasing pressure plate 104 away from engagement with clutch pack 96.

Upon engagement of mode clutch assembly 42, drive torque is transmitted from rear output shaft 38 through clutch pack 96 and a transfer assembly 112 to front output shaft 30. Transfer assembly 112 includes a first sprocket 114 rotatably supported by bearing assemblies 116 on rear output shaft 38, a second sprocket 118 fixed via a spline connection 120 to front output shaft 30 and a power chain 122 encircling sprockets 114 and 118. Clutch drum 94 is fixed for rotation with first sprocket 114 such that drive torque transferred through clutch pack 96 is transmitted through transfer assembly 112 to front output shaft 30.

Pressure plate 104 is axially moveable relative to clutch pack 96 between a first or "released" position and a second or "locked" position. With pressure plate 104 in its released position, a minimum clutch engagement force is exerted on clutch pack 96 such that virtually no drive torque is transferred through mode clutch assembly 42 so as to establish a two-wheel drive mode. Return spring 110 is arranged to normally urge pressure plate 104 toward its released position. In contrast, location of pressure plate 104 in its locked position causes a maximum clutch engagement force to be applied to clutch pack 96 such that front output shaft 30 is, in effect, coupled for common rotation with rear output shaft 38 so as to establish a locked or "part-time" four-wheel drive mode. Therefore, accurate control of the position of pressure plate 104 between its released and locked positions permits adaptive regulation of the torque transfer between rear output shaft 38 and front output shaft 30, thereby permitting establishment of an adaptive or "on-demand" four-wheel drive mode.

Power-operated actuation mechanism 44 is operable to coordinate movement of shift collar 80 between its three distinct range positions with movement of pressure plate 104 between its released and locked positions. In its most basic form, actuation mechanism 44 includes an electric motor 126, an actuator shaft 128 driven by electric motor 126, a range actuator assembly 130 and a mode actuator assembly 132. Actuator shaft 128 has its opposite ends supported by a pair of laterally-spaced bearing assemblies 134 for rotation in housing 56 about a third rotary axis. A reduction geartrain 136 provides a drive connection between a rotary output of electric motor 126 and actuator shaft 128. Reduction geartrain 136 includes a worm gearset (not shown) that is driven by the rotary output of electric motor 126 and a spur gearset 138. Actuation of electric motor 126 causes the worm gearset to drive a drive gear 140 associated with gearset 138. Specifically, drive gear 140 is a small diameter gear supported for rotation on an idler shaft 139 and which is meshed with a large diameter driven gear 142 fixed for rotation with actuation shaft 128. In particular, driven gear 142 includes a tubular hub segment 144 that is fixed via a spline connection 146 to actuator shaft 128 between a radial shaft flange 148 and rear bearing assembly 134. The cumulative reduction ratio provided by geartrain 136 permits the use of a smaller, low power electric motor. An angular position sensor or encoder 150 is mounted to an end portion of actuator shaft 128 for providing ECU 52 with an input signal indicative of the angular position of actuator shaft 128.

Figure 6:
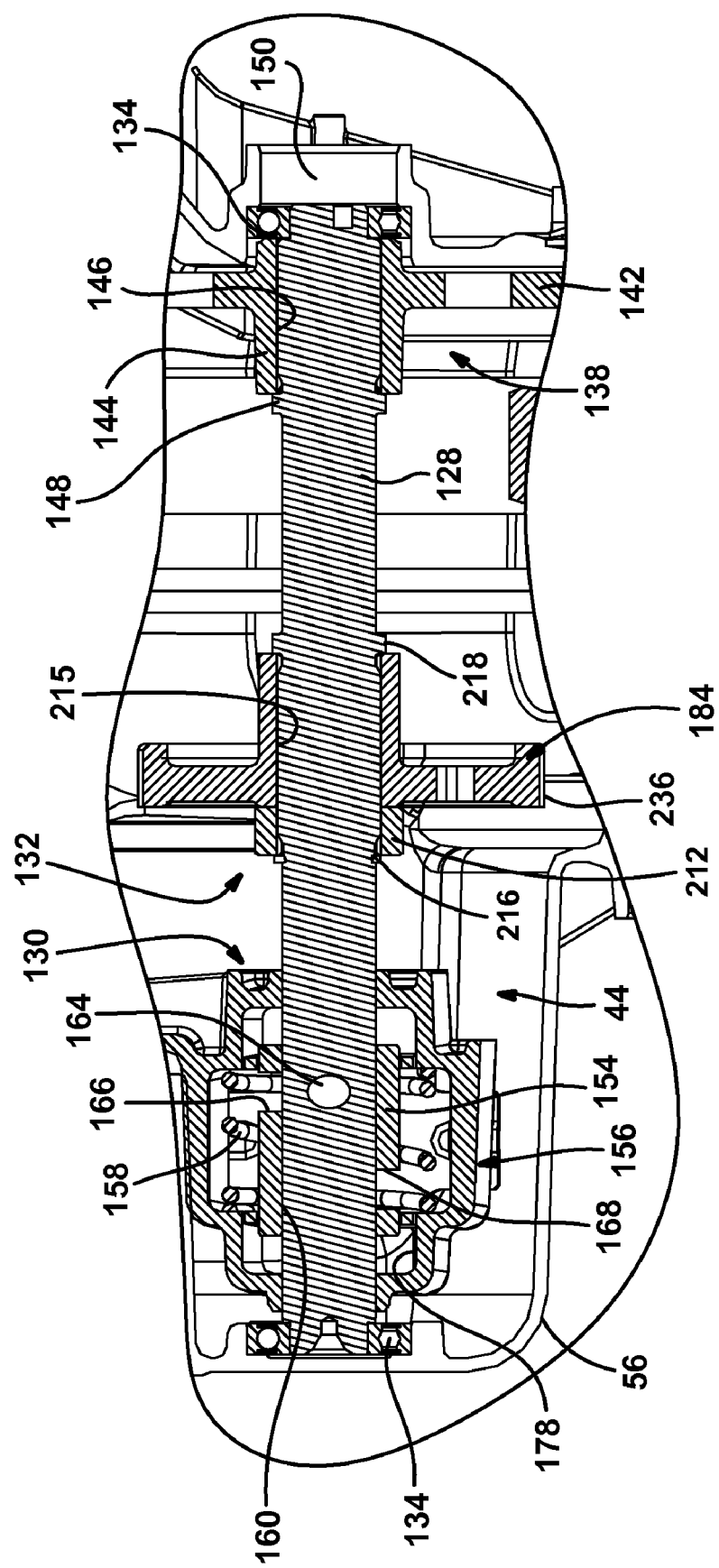
FIG. 6 is an enlarged partial view of FIG. 3 showing various components of the power-operated actuation mechanism in greater detail.
Figure 7:
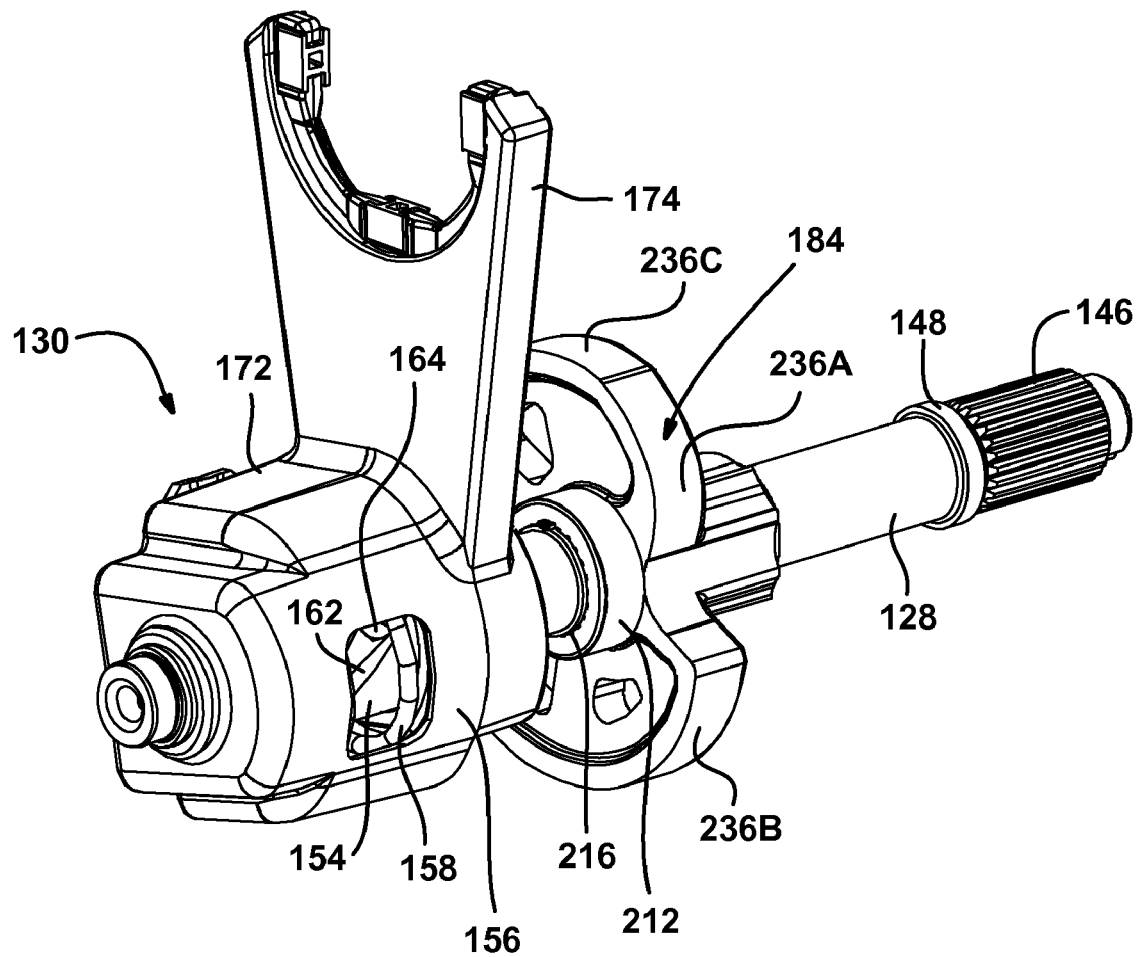
FIG. 7 is a perspective view of the actuator shaft assembly associated with the power-operated actuation mechanism of the present invention.
Figure 8:
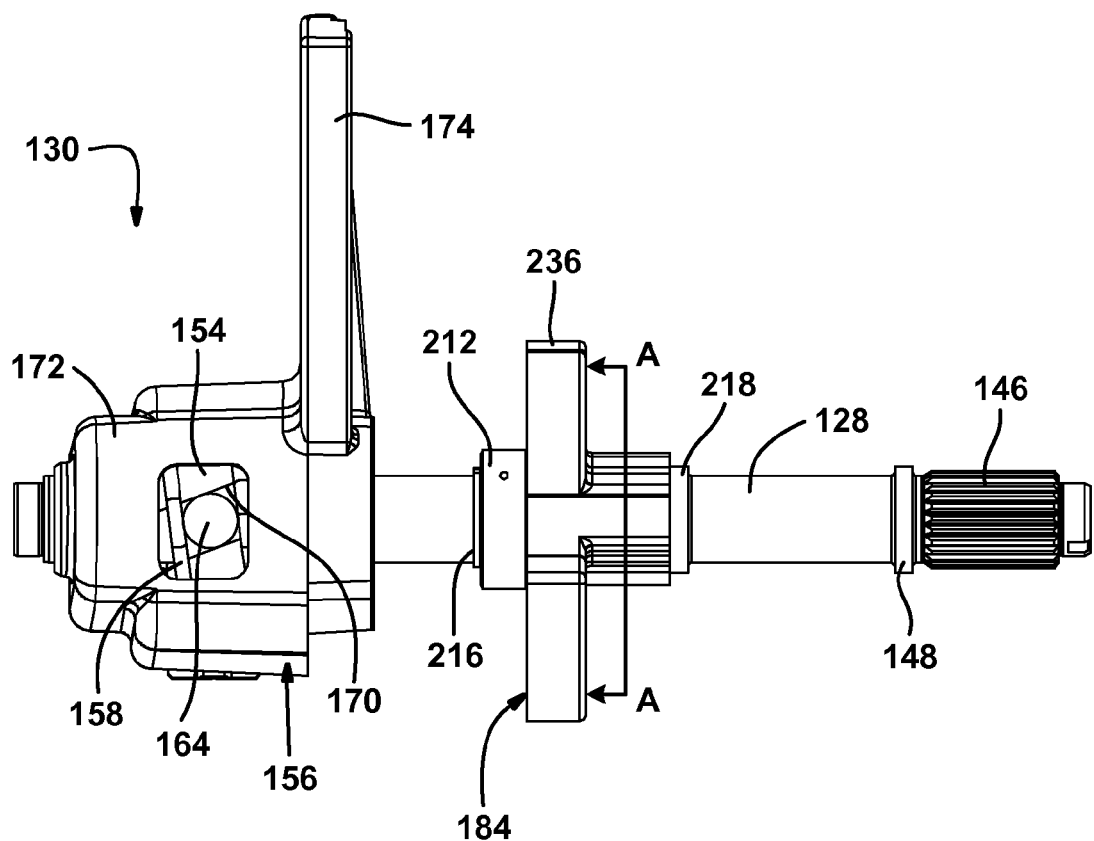
FIG. 8 is a side view of the actuator shaft assembly shown in FIG. 7.

Range actuator assembly 130 is operable to convert bidirectional rotary motion of actuator shaft 128 into bidirectional translational movement of shift collar 80 between its three distinct range positions. Referring primarily to FIGS. 6 through 8, range actuator assembly 130 is shown to generally include a range cam 154, a range fork 156 and a spring-biasing unit 158. Range cam 154 is a tubular member having an inner diameter surface 160 journalled for sliding movement on actuator shaft 128. An elongated shift slot 162 is formed in range cam 154 and receives a follower pin 164 that is fixed for rotation with actuator shaft 128. Slot 162 includes a high-range dwell segment 166, a low-range dwell segment 168 and a helical shift segment 170 interconnecting dwell segments 166 and 168. Range fork 156 includes a sleeve segment 172 supported for sliding movement on actuator shaft 128 and a fork segment 174 which extends from sleeve segment 172 into an annular groove 176 formed in shift collar 80. Sleeve segment 172 defines an interior chamber 178 within which range cam 154 and spring-biasing unit 158 are located. Spring-biasing unit 158 is operably disposed between range cam 154 and sleeve segment 172 of range fork 156. Spring-biasing unit 158 functions to urge range fork 156 to move axially in response to axial movement of range cam 154 while its spring compliance accommodates tooth "block" conditions that can occur between shift collar clutch teeth 82 and input shaft clutch teeth 84 or carrier clutch teeth 86. As such, spring-biasing unit 158 assures that range fork 156 will complete axial movement of shift collar 80 into its H and L range positions upon elimination of any such tooth block condition.

Range actuator assembly 130 is arranged such that axial movement of range cam 154 results from movement of follower pin 164 within shift segment 170 of slot 162 in response to rotation of actuator shaft 128. As noted, such movement of range cam 154 causes range fork 156 to move shift collar 80 between its three distinct range positions. Specifically, when it is desired to shift range unit 40 into its high-range drive mode, electric motor 126 rotates actuator shaft 128 in a first direction which, in turn, causes concurrent rotation of follower pin 164. Such rotation causes follower pin 164 to move within shift segment 170 of slot 162 for axially moving range cam 154 and range fork 156 until shift collar 80 is located in its H range position. With shift collar 80 in its H range position, the high-range drive connection is established between input shaft 54 and rear output shaft 38. Continued rotation of actuator shaft 128 in the first direction causes follower pin 164 to exit shift segment 170 of shift slot 162 and enter high-range dwell segment 166 for preventing further axial movement of range cam 154, thereby maintaining shift collar 80 in its H range position. The length of high-range dwell segment 166 of shift slot 162 is selected to permit sufficient additional rotation of actuator shaft 128 in the first rotary direction to accommodate actuation of mode clutch assembly 42 by mode actuator assembly 132.

With shift collar 80 in its H range position, subsequent rotation of actuator shaft 128 in the opposite or second direction causes follower pin 164 to exit high-range dwell segment 166 and re-enter helical shift segment 170 of range cam slot 162 for causing range cam 154 to begin moving shift collar 80 from its H range position toward its L range position. Upon continued rotation of actuator shaft 128 in the second direction, follower pin 164 exits shift segment 170 of range cam slot 162 and enters low-range dwell segment 168 for locating and maintaining shift collar 80 in its L range position, whereby the low-range drive connection between planet carrier 78 and rear output shaft 38 is established. Again, the length of low-range dwell segment 168 of shift slot 162 is selected to permit additional rotation of actuator shaft 128 in the second rotary direction required to accommodate complete actuation of mode clutch assembly 42.

Mode actuator assembly 132 is operable to convert bi-directional rotary motion of actuator shaft 128 into bidirectional translational movement of pressure plate 104 between its released and locked positions so as to permit adaptive regulation of the drive torque transferred through mode clutch assembly 42 to front output shaft 30. In general, mode actuator assembly 132 includes a ballramp unit 182 and a mode cam 184. Ballramp unit 182 is supported on rear output shaft 38 between a radial shaft flange 186 and pressure plate 104. Ballramp unit 182 includes a first cam member 188, a second cam member 190 and balls 192 disposed in aligned sets of tapered grooves 194 and 196 formed in corresponding face surfaces of cam members 188 and 190. In particular, grooves 194 are formed in a first face surface 198 on a cam ring segment 200 of first cam member 188. As seen, a thrust bearing assembly 202 is disposed between shaft flange 186 and a second face surface 204 of cam ring segment 200. First cam member 188 further includes a tubular sleeve segment 206 and an elongated lever segment 208. Sleeve segment 206 is supported on rear output shaft 38 via a bearing assembly 210. Lever segment 208 has a terminal end portion engaging a spacer collar 212 that is piloted on an and able to rotate relative to actuator shaft 128. Mode cam 184 is fixed via a spline connection 215 for common rotation with actuator shaft 128. A lock ring 216 axially locates spacer collar 212 and mode cam 184 relative to a radial shaft flange 218.

Second cam member 190 of ballramp unit 182 has its grooves 196 formed in a first face surface 220 of a cam ring segment 222 that is shown to generally surround portions of sleeve segment 206 of first cam member 188 and sleeve segment 108 of clutch hub 90. A thrust bearing assembly 224 and thrust ring 226 are disposed between a second face surface 228 of cam ring segment 222 and a face surface 230 of pressure plate 104. Second cam member 190 further includes an elongated lever segment 232 having a mode follower 234 mounted at its terminal end that rollingly engages a cam surface 236 formed on an outer peripheral edge of mode cam 184. As will be detailed, the contour of cam surface 236 on mode cam 184 functions to control angular movement of second cam member 190 relative to first cam member 188 in response to rotation of actuation shaft 128. Such relative angular movement between cam members 188 and 190 causes balls 192 to travel along tapered grooves 194 and 196 which, in turn, causes axial movement of second cam member 190. Such axial movement of second cam member 190 functions to cause corresponding axial movement of pressure plate 104 between its released and locked positions, thereby controlling the magnitude of the clutch engagement force applied to clutch pack 96.

As seen, lever segment 232 of second cam member 190 is located on one side of actuator shaft 128 while lever segment 208 of first cam member 188 is located on the opposite side of actuator shaft 128. Due to engagement of mode follower 234 with cam surface 236 on mode cam 184, second cam member 190 is angularly moveable relative to first cam member 188 between a first or "retracted" position and a second or "extended" position in response to rotation of actuator shaft 128. With second cam member 190 rotated to its retracted position, return spring 110 biases pressure plate 104 to its released position which, in turn, urges balls 192 to be located in deep end portions of aligned grooves 194 and 196. Thus, such movement of second cam member 190 to its angularly retracted position relative to first cam member 188 also functions to locate second cam member 190 in an axially retracted position relative to clutch pack 96. While not shown, a biasing unit may be provided between lever segments 208 and 232 to assist return spring 110 in normally urging second cam member 190 toward its retracted position. In contrast, angular movement of second cam member 190 to its extended position causes balls 192 to be located in shallow end portions of aligned grooves 194 and 196 which causes axial movement of second cam member 190 to an axially extended position relative to clutch pack 96. Such axial movement of second cam member 190 causes pressure plate 104 to be moved to its locked position in opposition to the biasing exerted thereon by return spring 110. Accordingly, control of angular movement of second cam member 190 between its retracted and extended positions functions to control concurrent movement of pressure plate 104 between its released and locked positions.

As previously noted, cam surface 236 of mode cam 184 and shift slot 162 of range cam 154 are configured to coordinate movement of shift collar 80 and pressure plate 104 in response to rotation of actuator shaft 128 for establishing a plurality of different drive modes. According to one possible control arrangement, mode selector 50 could permit the vehicle operator to select from a number of different two-wheel and four-wheel drive modes including, for example, a two-wheel high-range drive mode, an on-demand four-wheel high-range drive mode, a part-time four-wheel high-range drive mode, a Neutral mode and a part-time four-wheel low-range drive mode. Specifically, control system 46 functions to control the rotated position of actuator shaft 128 in response to the mode signal delivered to ECU 52 by mode selector 50 and the sensor input signals sent by sensors 48 to ECU 52.

Figure 9A:
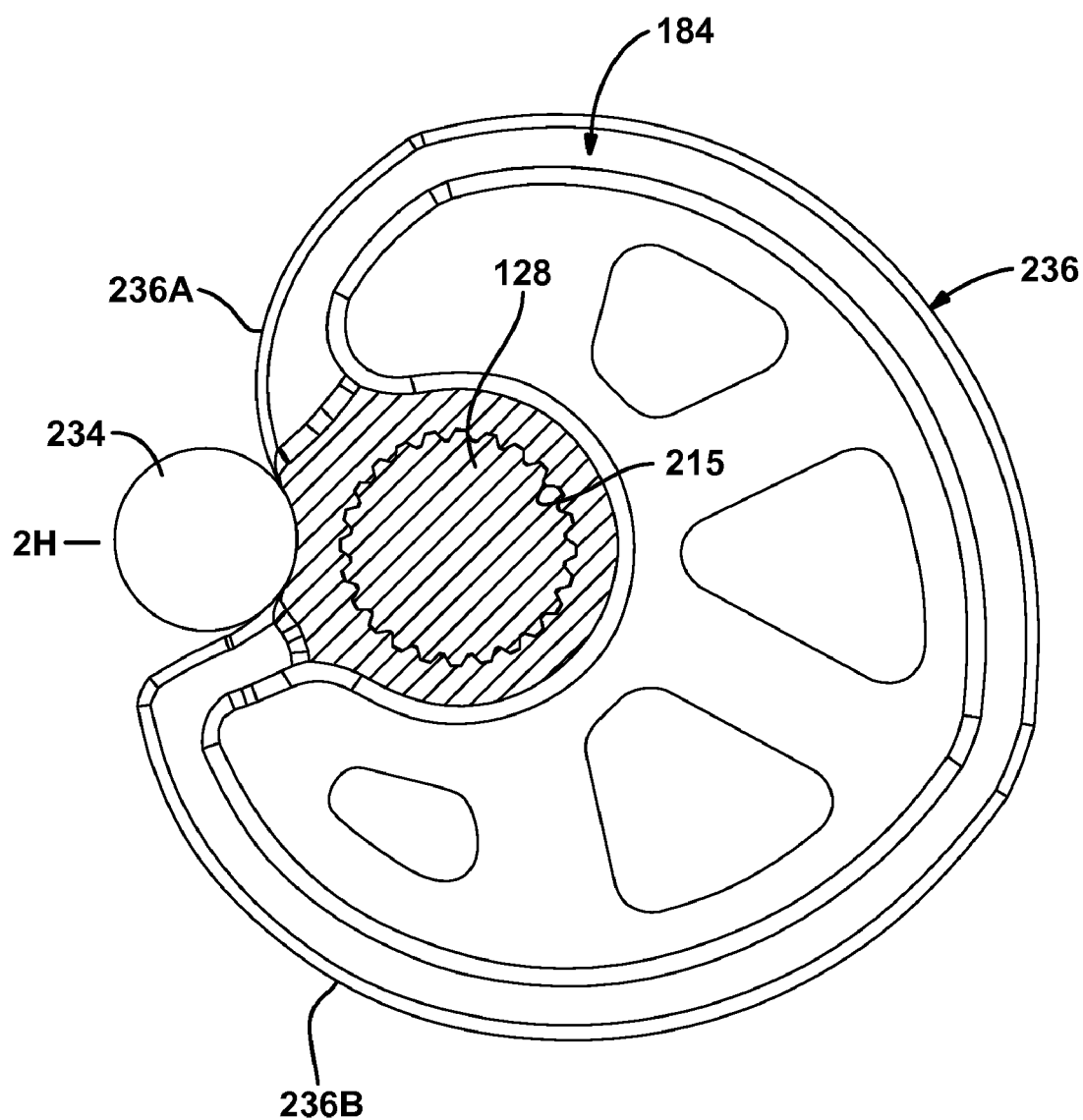
FIG. 9A through 9F are sectional views taken generally along line A-A in FIG. 8 showing the mode cam and the actuator shaft rotated to various positions for establishing different drive modes.

FIG. 9A illustrates actuator shaft 128 rotated to a "2H" position required to establish the two-wheel high-range drive mode. As understood, the two-wheel high-range drive mode is established when shift collar 80 is located in its H range position and pressure plate 104 is located in its released position relative to clutch pack 96. As such, input shaft 54 drives rear output shaft 38 at a direct speed ratio while mode clutch assembly 42 is released such that all drive torque is delivered to rear driveline 14. Mode follower 234 is shown engaging a detent portion of a first cam segment 236A of cam surface 236 on mode cam 184 which functions to locate second cam member 190 in its retracted position.

Figure 9B:
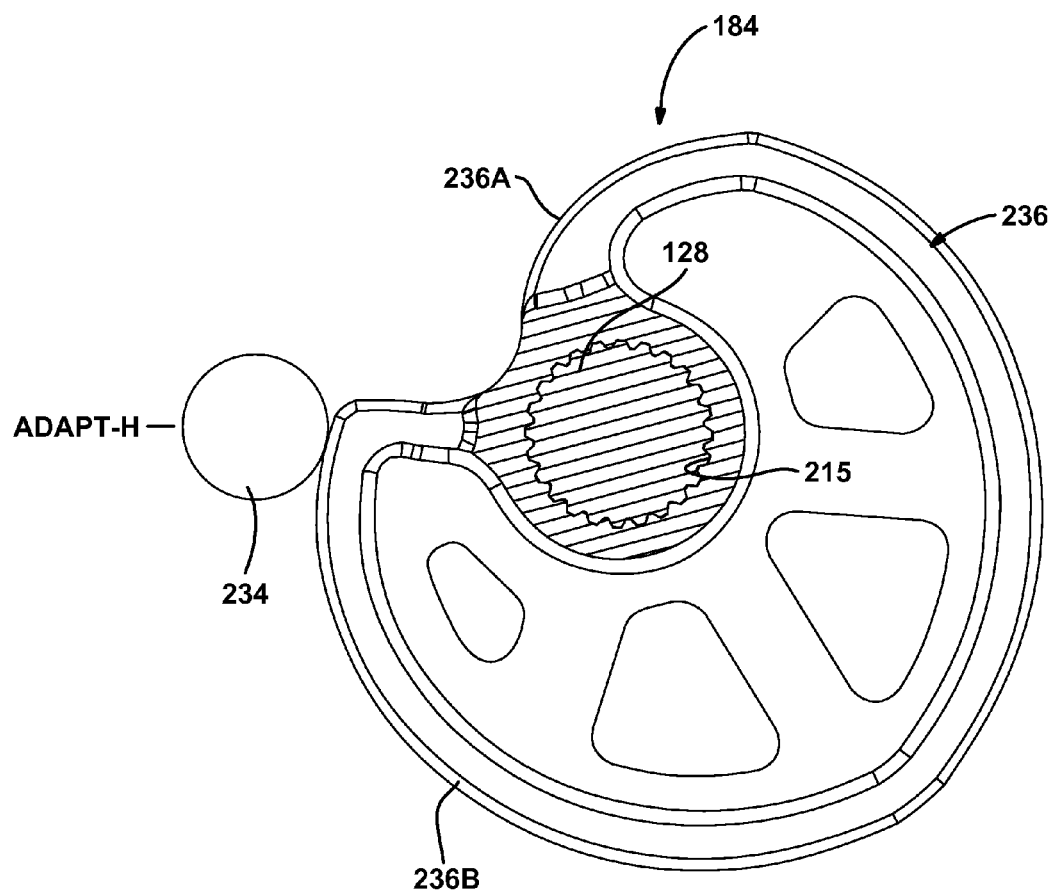

If the on-demand four-wheel high-range drive mode is thereafter selected, electric motor 126 is energized to initially rotate actuator shaft 128 in a first (i.e., clockwise) direction from its 2H position to the "ADAPT-H" position shown in FIG. 9B. In this rotated position of actuator shaft 128, follower pin 164 is located within high-range dwell segment 166 of shift slot 162 in range cam 154 such that shift collar 80 is maintained in its H range position for maintaining the direct drive connection between input shaft 54 and rear output shaft 38. However, such rotation of actuator shaft 128 to its ADAPT-H position causes concurrent rotation of mode cam 184 to the position shown which, in turn, causes mode follower 234 to engage a first end portion of a second cam segment 236B of mode cam surface 236. Such movement of mode follower 234 from first cam segment 236A to second cam segment 236B causes second cam member 190 to move angularly relative to first cam member 188 from its retracted position to an intermediate or "ready" position. With second cam member 190 rotated to its ready position, ballramp unit 182 causes pressure plate 104 to move axially from its released position into an "adapt" position that is operable to apply a predetermined "preload" clutch engagement force on clutch pack 96. The adapt position of pressure plate 104 provides a low level of torque transfer across mode clutch assembly 42 that is required to take-up clearances in clutch pack 96 in preparation for adaptive control. Thereafter, ECU 52 determines when and how much drive torque needs to be transmitted across mode clutch assembly 42 to limit driveline slip and improve traction based on the current tractive conditions and operating characteristics detected by sensors 48. As an alternative, the adapt position for pressure plate 104 can be selected to partially engage mode clutch assembly 42 for establishing a desired front/rear torque distribution ratio (i.e., 10/90, 25/75, 40/60, etc.) between front output shaft 30 and rear output shaft 38.

Figure 9C:
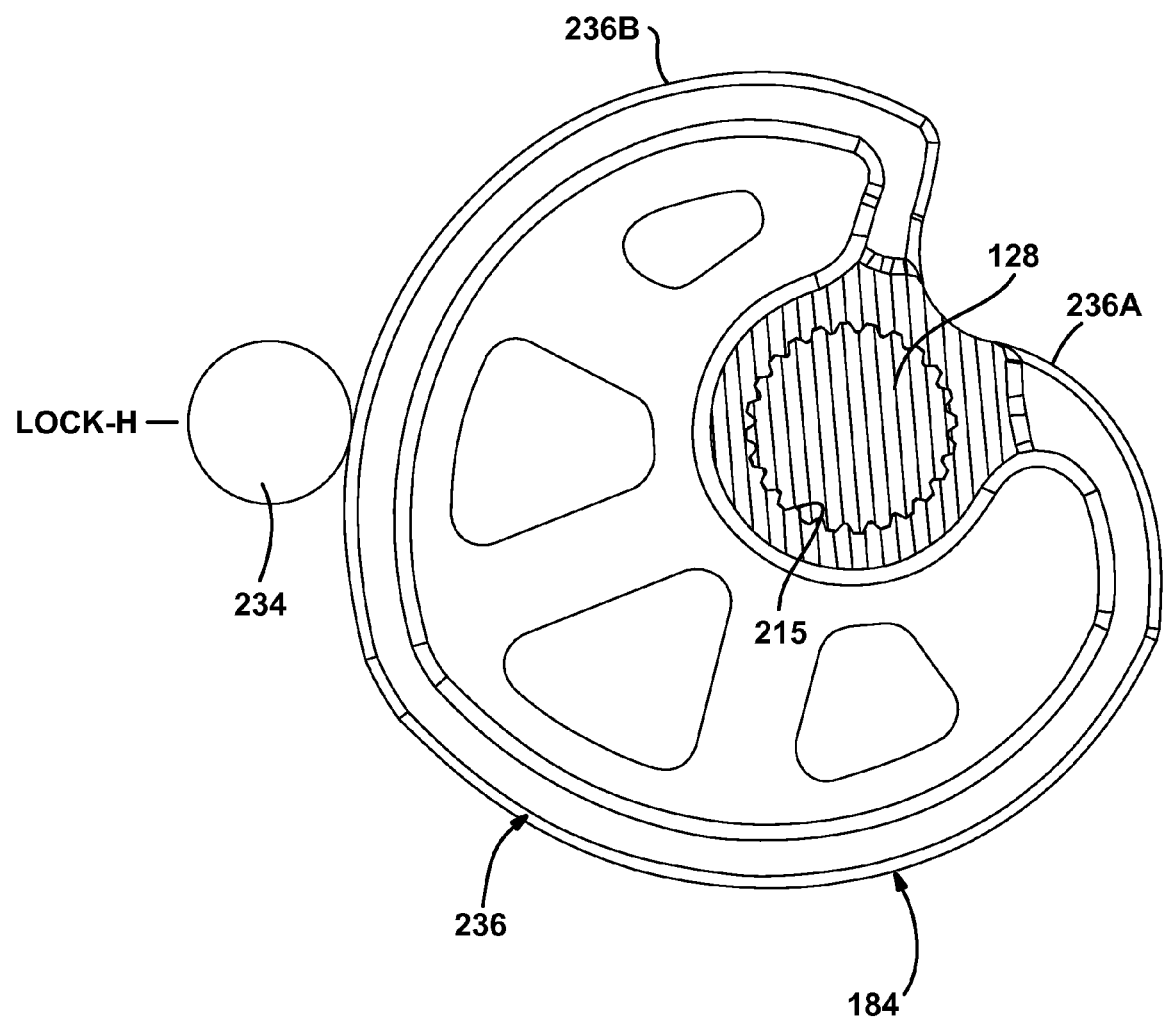

The limits of adaptive control in the on-demand four-wheel high-range drive mode are established by controlling bidirectional rotation of actuator shaft 128 between its ADAPT-H position of FIG. 9B and its "LOCK-H" position shown in FIG. 9C. With actuator shaft 128 in its LOCK-H position, second segment 236B of mode cam surface 236 causes second cam member 190 to move to its extended position, thereby causing pressure plate 104 to move to its locked position for fully engaging mode clutch assembly 42. This range of angular travel of actuator shaft 128 causes follower pin 164 to travel within high-range dwell segment 166 of range cam slot 162 so as to maintain shift collar 80 in its H range position. However, such rotation of actuator shaft 128 results in mode follower 234 riding along second segment 236B of cam surface 236 which, in turn, is configured to control angular movement of second cam member 190 between its ready position and its extended position. Bi-directional rotation of actuator shaft 128 within this range of travel is controlled by ECU 52 actuating electric motor 126 based on a pre-selected torque control strategy. As will be understood, any control strategy known in the art for adaptively controlling torque transfer across mode clutch assembly 42 can be utilized with the present invention.

If the vehicle operator selects the part-time four-wheel high-range drive mode, electric motor 126 is energized to rotate actuator shaft 128 in the first direction to its LOCK-H position shown in FIG. 9C. As such, shift collar 80 is maintained in its H range position and mode cam 234 causes second cam member 190 to move to its extended position which, in turn, moves pressure plate 104 to its locked position for fully engaging mode clutch assembly 42. To limit the on-time service requirements of electric motor 126, a power-off brake 240 associated with electric motor 126 can be engaged to brake rotation of the motor output so as to prevent back-driving of geartrain 136 for holding pressure plate 104 in its locked position. In this manner, electric motor 126 can be shut-off after the part-time four-wheel high-range drive mode has been established.

Figure 9D:
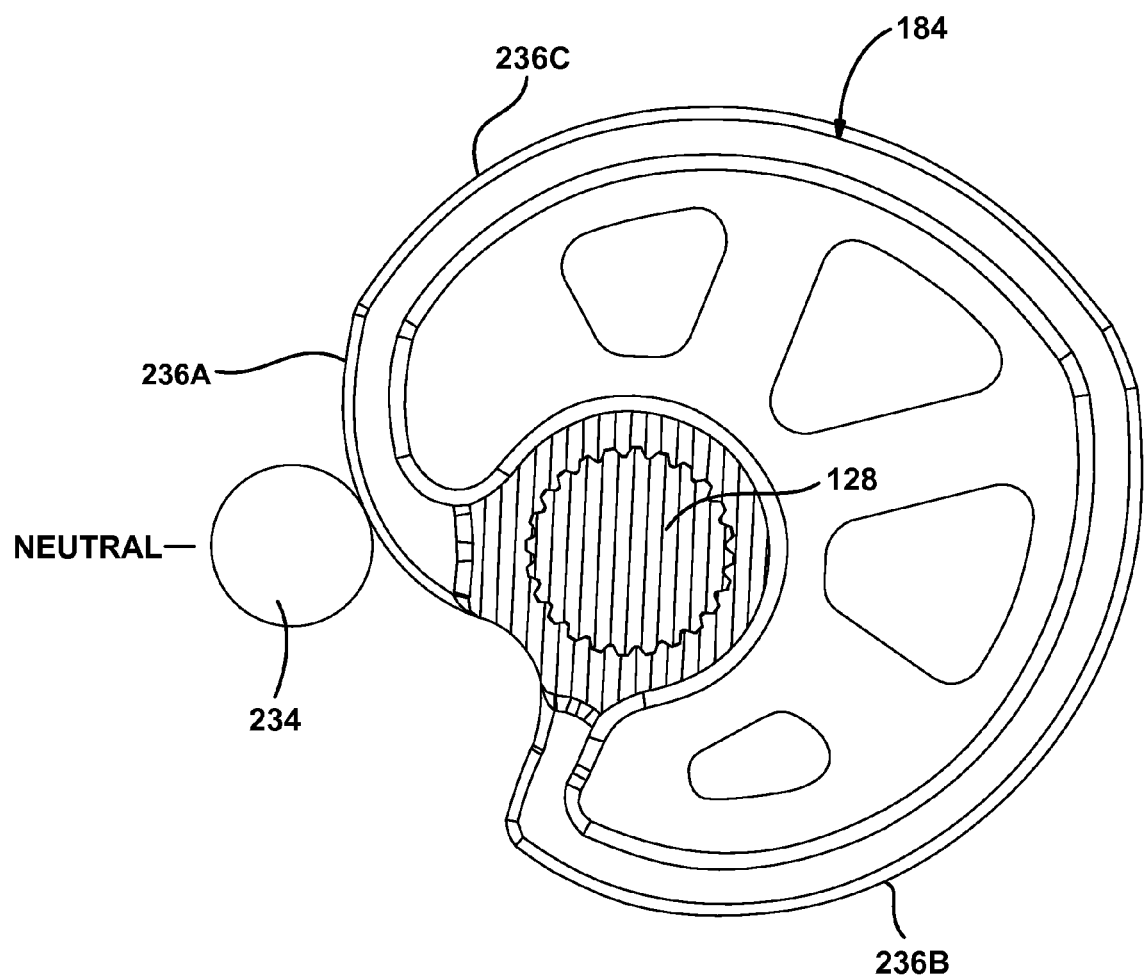

If the Neutral mode is selected, electric motor 126 is energized to rotate actuator shaft 128 in a second (i.e., counter-clockwise) direction to the Neutral position shown in FIG. 9D. Such rotation of actuator shaft 128 causes follower pin 164 to exit high-range dwell segment 166 and ride within shift segment 170 of range cam slot 162 until shift collar 80 is located in its N position. Concurrently, rotation of mode cam 184 causes mode follower 234 to engage a portion of first segment 236A of cam surface 236 that is configured to move second cam member 190 to a position displaced from its retracted position. Such movement of second cam member 190 results in limited axial movement of pressure plate 104 from its released position toward clutch pack 96. Preferably, such movement of pressure plate 104 does not result in any drive torque being transferred through mode clutch assembly 42 to front driveline 12.

Figure 9E:
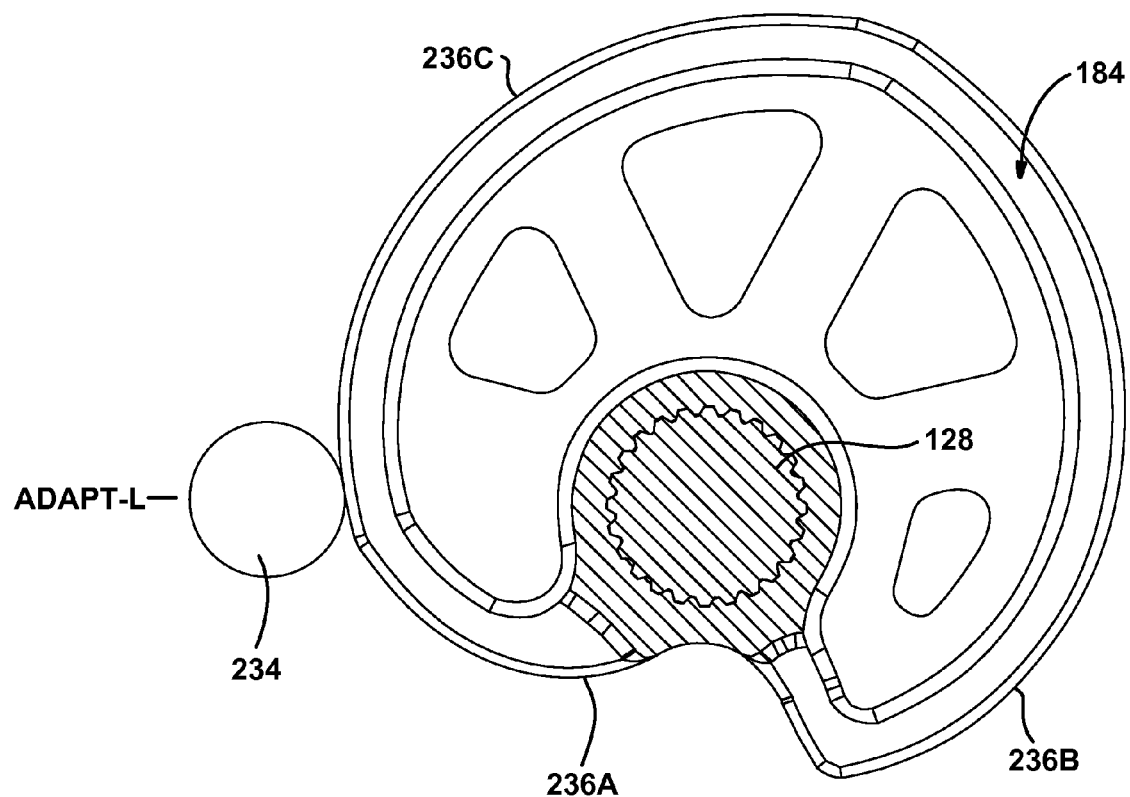
Figure 9F:
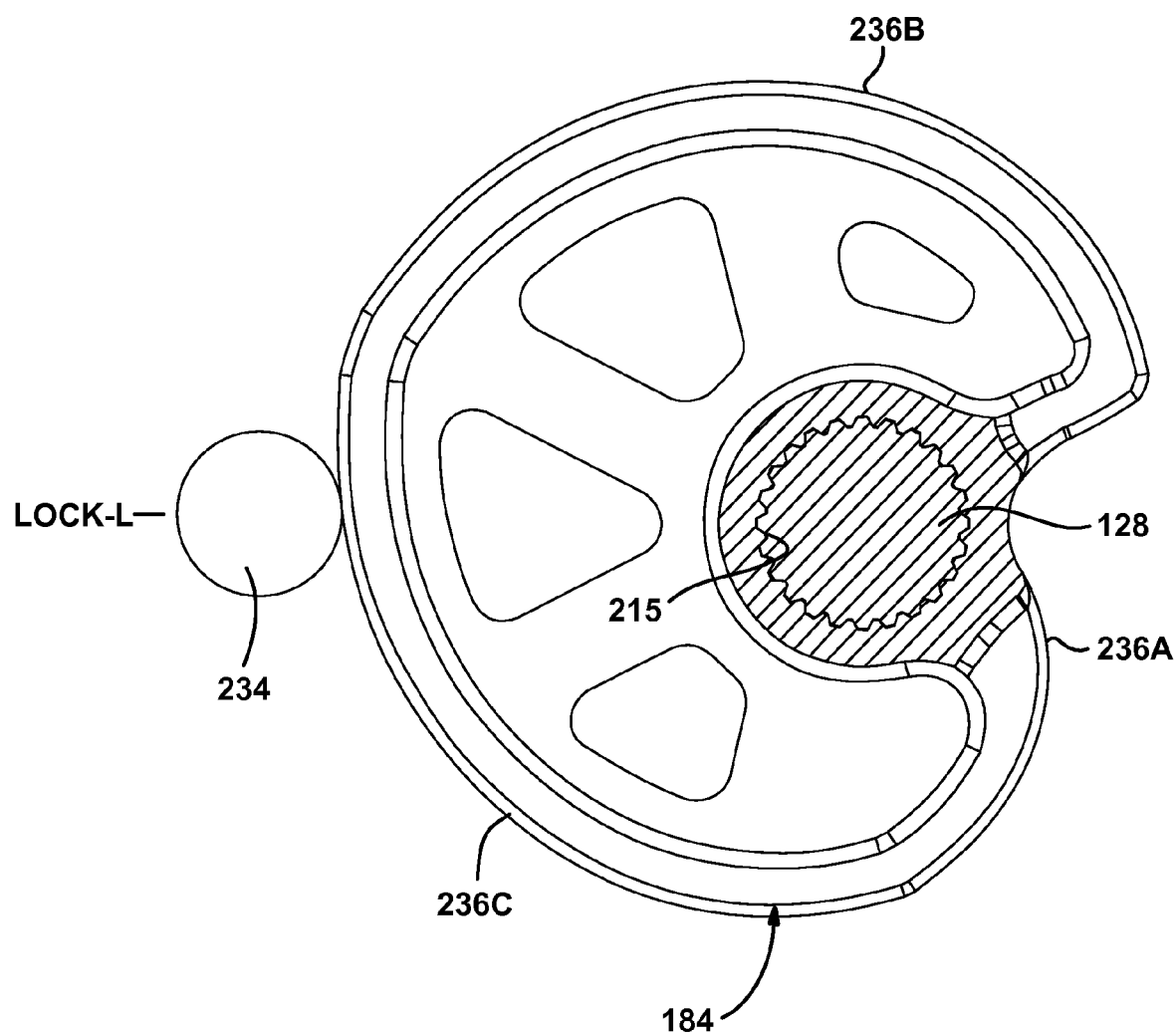
Figure 10:
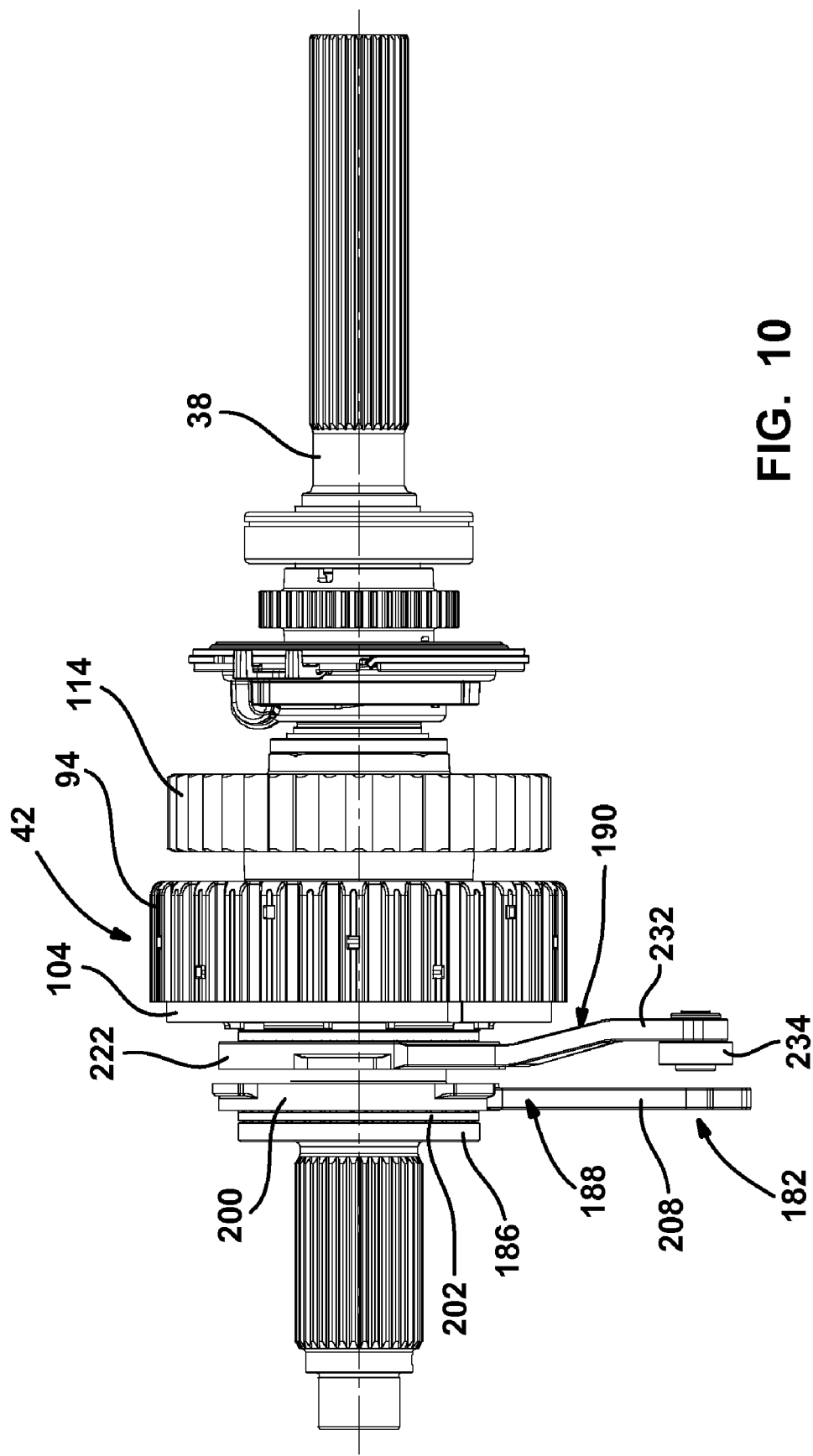
FIG. 10 is a side view of the mainshaft assembly showing components of a ballramp unit associated with the actuation mechanism.

FIGS. 9E and 9F illustrate continued rotation of actuator shaft 128 in the second direction which occurs when the part-time four-wheel low-range drive mode is selected. In particular, FIG. 9E shows an intermediate "ADAPT-L" position of actuator shaft 128 whereat range pin 164 enters low-range dwell segment 168 of range cam slot 162 for locating shift collar 80 in its L range position. Mode cam 184 has likewise been rotated for locating mode follower 234 at the interface between first segment 236A of cam surface 236 and a third segment 236C thereof. The contour of third segment 236C is configured such that second cam member 190 will be rotated to its ready position when mode follower 234 is in the position shown. As previously noted, movement of second cam member 190 to its ready position causes pressure plate 104 to move axially to its adapt position. However, selection of the part-time four-wheel low-range drive mode causes continued rotation of actuator shaft 184 to its LOCK-L position shown in FIG. 9F. Low-range dwell segment 168 in range cam slot 162 maintains shift collar 80 in its L range position while third segment 236C of mode cam surface 236 causes mode follower 234 to move second cam member 190 to its extended position, thereby moving pressure plate 104 to its locked position for fully engaging mode clutch assembly 42. Again, power-off brake 240 can be actuated to maintain actuator shaft 128 in its LOCK-L position.

Based on the preferred arrangement disclosed for actuation mechanism 44, actuator shaft 128 is rotatable through a first range of angular travel to accommodate range shifting of shift collar 80 as well as second and third ranges of angular travel to accommodate engagement of mode clutch assembly 42. In particular, the first range of angular travel for actuator shaft 128 is established between its ADAPT-H and ADAPT-L positions. The second range of travel for actuator shaft 128 is defined between its ADAPT-H and LOCK-H positions to permit adaptive control of mode clutch 42 with shift collar 80 in the H range position. Likewise, the third range of actuator shaft travel is defined between its ADAPT-L and LOCK-L positions to permit actuation of mode clutch 42 while shift collar 80 is in its L range position.

The above referenced embodiment clearly sets forth the novel and unobvious features, structure and/or function of the present invention. However, one skilled in the art will appreciate that equivalent elements and/or arrangements made be used which will be covered by the scope of the following claims.

What is claimed is:

1. A transfer case comprising:
an input shaft;
first and second output shafts;
a range unit driven at a reduced speed relative to said input shaft;
a range clutch operable in a first range position to establish a drive connection between said input shaft and said first output shaft and further operable in a second range position to establish a drive connection between said range unit and said first output shaft;
a mode clutch operable in a first mode position to disengage said second output shaft from driven engagement with said first output shaft and further operable in a second mode position to establish a drive connection between said first output shaft and said second output shaft;
a geartrain having an input gear driving an output gear;
an electric motor driving said input gear;
an actuator shaft driven by said output gear;
a range actuator driven by said actuator shaft for moving said range clutch between its first and second range positions;
a mode actuator driven by said actuator shaft for moving said mode clutch between its first and second mode positions, said mode actuator including a mode cam driven by said actuator shaft and a ball ramp unit having a first cam member, a second cam member disposed for rotation and axial movement relative to said first cam member, and rollers disposed in cam grooves formed between said first and second cam members, said first cam member having a first lever segment disposed on one side of said actuator shaft and said second cam member having a second lever segment disposed on an opposite side of said actuator shaft which includes a mode follower engaging a cam surface on said mode cam, said cam surface is configured to cause movement of said second cam member relative to said first cam member between a retracted position and an extended position in response to rotation of said mode cam with said actuator shaft for moving said mode clutch between its first and second mode positions; and a control system for actuating said motor to control the magnitude and direction of rotation of said actuator shaft so as to coordinate movement of said range clutch and said mode clutch.

2. The transfer case of claim 1 wherein said actuator shaft is rotatable through three distinct ranges of travel.

3. The transfer case of claim 2 wherein rotation of said actuator shaft through a first range of travel causes said range actuator to move said range clutch between its first and second range positions while said mode actuator maintains said mode clutch in its first mode position, and wherein rotation of said actuator shaft through a second range of travel causes said range actuator to maintain said range clutch in its first range position while said mode actuator moves said mode clutch between its first and second mode positions.

4. The transfer case of claim 3 wherein rotation of said actuator shaft through a third range of travel causes said range actuator to maintain said range clutch in its second range position while said mode actuator moves said mode clutch between its first and second mode positions.

5. The transfer case of claim 1 wherein said geartrain includes a first gearset having said input gear driven by said motor and a first transfer gear driven by said input gear for rotation about a first axis, and wherein said geartrain includes a second gearset having a second transfer gear driven by said first transfer gear and which drives said output gear for rotation about a second axis.

6. The transfer case of claim 1 wherein said range actuator comprises:

a follower fixed for rotation with said actuator shaft;

a range cam supported on said actuator shaft and having a shift slot within which said follower is disposed, said shift slot configured to convert rotary movement of said actuator shaft into axial movement of said range cam;

a shift fork coupled to said range clutch; and a biasing mechanism interconnecting said shift fork to said range cam for converting axial movement of said range cam into axial movement of said shift fork for moving said range clutch between its first and second range positions.

7. The transfer case of claim 6 wherein said shift slot in said range cam includes a first dwell segment, a second dwell segment and a shift segment interconnecting said first and second dwell segments, said shift segment is configured to cause axial movement of said range clutch between its first and second range positions during rotation of said actuator shaft through a first range of rotary travel, said first dwell segment is configured to maintain said range clutch in its first range position during rotation of said actuator shaft through a second range of rotary travel, and said second dwell segment is configured to maintain said range clutch in its second range position during rotation of said actuator shaft through a third range of rotary travel.

8. A transfer case comprising:

an input shaft;

first and second output shafts;

a range unit driven by said input shaft and having an output component driven at a reduced speed relative to said input shaft;

a dog clutch operable in a first range position to couple said input shaft to said first output shaft for establishing a high-range drive connection, said dog clutch is further operable in a second range position to couple said output component of said range unit to said first output shaft for establishing a low-range drive connection;

a mode clutch including a clutch pack operably disposed between said first and second output shafts and a pressure plate moveable between a first mode position whereat a minimum clutch engagement force is exerted on said clutch pack and a second mode position whereat a maximum clutch engagement force is exerted on said clutch pack; and an actuation mechanism including a geartrain having an input gear and an output gear, a motor driving said input gear, an actuator shaft driven by said output gear, a range actuator driven by said actuator shaft for moving said dog clutch between its first and second range positions, and a mode actuator driven by said actuator shaft for moving said pressure plate between its first and second mode positions, said mode actuator including a mode cam driven by said actuator shaft and a ball ramp unit having a first cam member, a second cam member disposed for rotation and axial movement relative to said first cam member, and rollers disposed in cam grooves formed between said first and second cam members, said first cam member having a first lever segment disposed on one side of said actuator shaft and said second cam member having a second lever segment disposed on an opposite side of said actuator shaft which includes a mode follower engaging a cam surface on said mode cam, said cam surface is configured to cause movement of said second cam member relative to said first cam member between a retracted position and an extended position in response to rotation of said mode cam with said actuator shaft for moving said pressure plate between its first and second mode positions, and wherein said actuator shaft being rotatable through three distinct ranges of rotary travel for causing said range actuator and said mode actuator to coordinate movement of said dog clutch and said pressure plate.

9. The transfer case of claim 8 wherein said actuator shaft is rotatable through a first range of travel for causing said range actuator to move said dog clutch between its first and second range positions while said mode actuator maintains said pressure plate in its first mode positions, wherein said actuator shaft is rotatable through a second range of travel for causing said range actuator to maintain said dog clutch in its first range position while said mode actuator moves said pressure plate between its first and second mode positions, and wherein said actuator shaft is rotatable through a third range of travel for causing said range actuator to maintain said dog clutch in its second range position while said mode actuator moves said pressure plate between its first and second mode positions.

10. The transfer case of claim 8 wherein said geartrain includes a first gearset having said input gear driven by said motor and a first transfer gear driven by said input gear for rotation about a first axis, and wherein said geartrain includes a second gearset having a second transfer gear driven by said first transfer gear and which drives said output gear for rotation about a second axis.

11. The transfer case of claim 8 wherein said range actuator comprises:
   a follower fixed for rotation with said actuator shaft;
   a range cam supported on said actuator shaft and having a shift slot within which said follower is disposed, said shift slot is configured to convert rotary movement of said actuator shaft into axial movement of said range cam;
   a shift fork coupled to said dog clutch; and
   a biasing mechanism interconnecting said shift fork to said range cam which is operable to convert axial movement of said range cam into axial movement of said shift fork for moving said dog clutch between its first and second range positions.

12. The transfer case of claim 11 wherein said shift slot in said range cam includes a first dwell segment, a second dwell segment and a shift segment interconnecting said first and second dwell segments, said shift segment is configured to cause axial movement of said dog clutch between its first and second range positions during rotation of said actuator shaft through a first range of rotary travel, said first dwell segment is configured to maintain said dog clutch in its first range position during rotation of said actuator shaft through a second range of rotary travel, and said second dwell segment is configured to maintain said dog clutch in its second range position during rotation of said actuator shaft through a third range of rotary travel.

13. A transfer case, comprising:
   first and second shafts;
   a mode clutch operable in a first mode to disengage said second shaft from driven engagement with said first shaft and in a second mode to establish a drive connection between said first and second shafts;
   an actuator shaft;
   an electric motor operable for rotating said actuator shaft; and
   a mode actuator driven by said actuator shaft for shifting said mode clutch between its first and second modes, said mode actuator including a mode cam driven by said actuator shaft and a cam mechanism disposed between said mode cam and an axially moveable clutch component of said mode clutch, said cam mechanism including a first cam member having a first lever segment disposed on one side of said actuator shaft and a second cam member having a second lever segment disposed on an opposite side of said actuator shaft and supporting a follower engaging a cam surface on said mode cam, said cam surface is configured to cause relative rotation between said first and second cam members in response to rotation of said actuator shaft for moving said clutch component between first and second mode positions for shifting said mode clutch between its first and second modes.

14. The transfer case of claim 13 further including a control system for controlling actuation of said electric motor so as to control the direction and magnitude of rotary movement of said actuator shaft.

15. The transfer case of claim 13 wherein said cam mechanism further includes a cam surface formed between said first and second cam members operable to cause axial movement of said second cam member relative to said first cam member between first and second cam positions which, in turn, causes axial movement of said clutch component between its first and second mode positions.

16. The transfer case of claim 13 wherein said cam surface is formed on an outer edge surface of said mode cam, wherein said follower extends outwardly from said second lever segment of said second cam member and rollingly engages said cam surface, and wherein said first lever segment of said first cam member engages a collar mounted on said actuator shaft adjacent to said mode cam.

17. The transfer case of claim 13 wherein said first cam member is inhibited from axial and rotary movement relative to said second cam member.

* * * * *